No. 670,923. Patented Apr. 2, 1901.
E. T. ALLEN & E. H. GRIFFIN.
PHOROMETER.
(Application filed May 3, 1900.)
(No Model.)
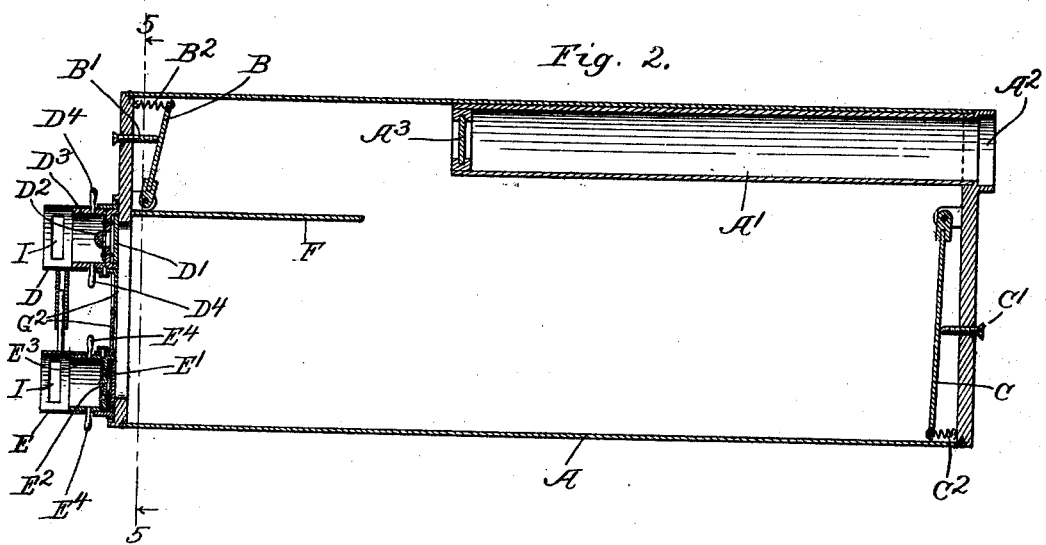
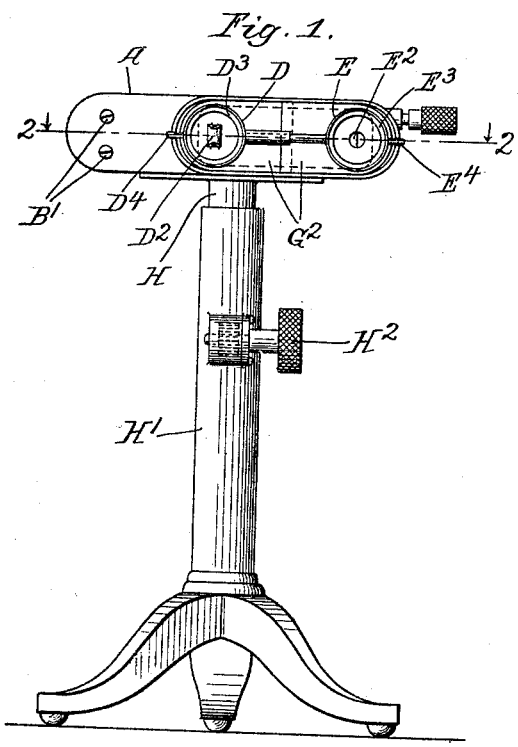
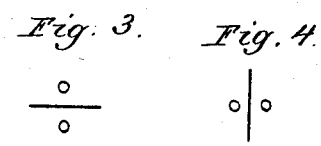
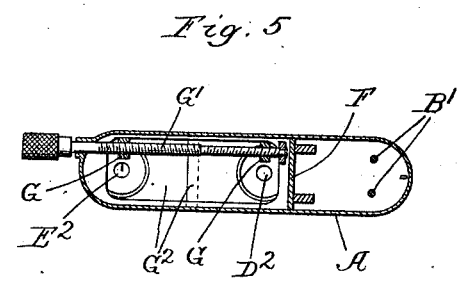
Witnesses.
Edward T. Wray.
Homedd P. Craft
Inventors.
Edmund T. Allen
Egbert Hewitt Griffin
by Parker & Carter
his Atty's
THE NORRIS PETERS CO., PHOTO-LITHO., WASHINGTON, D. C.

UNITED STATES PATENT OFFICE.

EDMUND T. ALLEN AND EGBERT HEWITT GRIFFIN, OF CHICAGO, ILLINOIS, ASSIGNORS TO THE L. MANASSE COMPANY, OF SAME PLACE.

PHOROMETER.

SPECIFICATION forming part of Letters Patent No. 670,923, dated April 2, 1901.

Application filed May 3, 1900. Serial No. 15,308. (No model.)

*To all whom it may concern:*

Be it known that we, EDMUND T. ALLEN and EGBERT HEWITT GRIFFIN, citizens of the United States, residing at Chicago, in the county of Cook and State of Illinois, have invented a certain new and useful Improvement in Phorometers, of which the following is a specification.

Our invention relates to instruments for testing the eyes, and has for its object to provide a new and improved instrument for this purpose.

Our invention is illustrated in the accompanying drawings, wherein—

Figure 1 is a front end view of a construction embodying our invention. Fig. 2 is a section on line 2 2, Fig. 1. Fig. 3 is a view showing the images seen through the eyepieces as they should appear to the normal eye when the device is adjusted for the vertical muscles. Fig. 4 is a similar view when the device is adjusted for the horizontal muscles. Fig. 5 is a section on line 5 5, Fig. 1.

Like letters refer to like parts throughout the several figures.

One of the objects of our invention is to provide one instrument by means of which a complete test can be made for heterophoria—that is, insufficiency of the muscles of rotation of the eye.

We have shown in the drawings one construction embodying our invention. In this construction we provide a suitable casing A, of any desirable material and formed in any suitable shape. This casing is provided with a light passage-way $A'$, which has an admission-opening $A^2$ for the admission of the light. The light may be taken from any source, either an artificial source or the sun or sky. The light passage-way $A'$, as herein shown, consists of a tube extending only part way the length of the casing A. This tube is provided at its inner end with a glass end piece $A^3$. In front of the light passage-way $A'$ is provided a suitable light deflecting or reflecting device B. This may consist of a mirror or a prism or any other suitable device. The device B is preferably made adjustable in any desired manner. As herein shown, said deflecting device is pivotally connected with some part of the casing A and is provided with a suitable adjusting device, consisting of one or more adjusting-screws $B'$ and a retracting-spring $B^2$. A second light deflecting or reflecting device C is placed at the rear of the casing A and is also provided with a suitable adjusting device, which, as shown, consists of one or more adjusting-screws $C'$ and the spring $C^2$. The casing is also provided with the two eyepieces D and E, which are preferably made adjustable, so that they may be moved to and from each other to adjust to the position of the eyes of the person looking through them. Any suitable adjusting device may be used. As herein shown, the eyepieces are provided with projecting lugs G, having screw-threaded openings. A rod $G'$, having a right and left hand screw-thread, engages said lugs, so that when rotated in one direction the eyepieces will move toward each other and when rotated in the other direction said eyepieces will be separated. Said eyepieces are provided with overlapping parts $G^2$, which slide upon each other when the parts are adjusted and which prevent the outside light from entering the casing A. A partition F is provided and is placed between the eyepieces and the light passage-way $A'$, so as to shut off the light coming through said passage-way and prevent it from passing directly to the eyepieces. One of the eyepieces—say, for example, the eyepiece D—is provided with a red glass $D'$, and in combination with this glass is used some suitable device or lens for distorting the light, so that on looking therethrough a long red line or streak is seen. Any suitable device for this purpose can be used, and, as herein illustrated, we have shown a maddox-rod $D^2$, which consists of a round rod with one side flattened. The eyepiece E is provided with a green glass $E'$, and a suitable device or lens is used with it for doubling the image or device seen through the eyepiece. As herein shown, we use the double prisms $E^2$, having the bases placed together. The maddox-rod and the double prisms are fastened in suitable parts $D^3 E^3$, so that they can be movably attached to the eyepieces D and E, thus permitting them to be rotated, as it were, in order that their position may be varied. Suitable pins $D^4 E^4$ are provided for facilitating this rotation and variation of said parts.

It is of course evident that any construction for holding the parts in position may be used.

The casing A may be adjustably mounted in any desired manner. As herein shown, it is provided with a projecting support H, which works in the stand H', the stand being provided with a pinion which engages a rack on the support H, the casing being raised or lowered by operating the thumb-screw H².

We have described in detail a particular construction in order to make our invention clear; but it is of course evident that the parts may be varied in many particulars without in any manner departing from the spirit of our invention, and we therefore do not limit ourselves to the construction shown.

In operating the device the light passage-way A' is directed toward a suitable source of light. The light then enters the passage-way and strikes the reflecting device B. This reflecting device is suitably adjusted to throw the light toward the reflecting device C. Said latter reflecting device is suitably adjusted to throw the light toward the eyepieces. The person looking through the eyepiece D when the instrument is properly adjusted will see a red streak, and upon looking through the eyepiece E he will see two green spots. If now the eyepieces are properly adjusted and a patient whose extrinsic eye-muscles are all normal looks through them he will see the red streak midway between the two green spots. When the test is being made for the verticle muscles, the lenses of the eyepieces are moved so that the red streak appears in a horizontal position between the two green spots, as shown in Fig. 3. In order to test the horizontal muscles, the lenses are turned ninety degrees, so that the red streak appears vertical, the green spots being located at each side thereof in a horizontal line, as shown in Fig. 4. If the muscles are insufficient, the red streak will be displaced with relation to the green spots and the amount of displacement may be ascertained by inserting suitable prisms in the openings I in the eyepieces while the patient is looking through said eyepieces. The prism inserted to bring the red streak midway between the two green spots indicates the correction necessary to remedy the defect in the eye-muscles.

It is of course evident that instead of using red and green glass we may use any other glass or any other means of producing a contrast of color, so as to prevent any confusion between the images seen through the two eyepieces.

It is of course desirable that all light except that entering through the light passage-way A' be excluded, so that the patient looks into a perfectly dark chamber, where the only things to be seen are the red streak and the green spots.

We claim—

1. A device for manipulating testing-lenses for use in testing the eyes, consisting of a case which serves as a dark chamber, having a light-aperture at one end, a passage-way for such light, an adjustable mirror at the opposite end to receive the light, a second adjustable mirror on the same end as the light-receiving aperture, and two lens-receiving eyepieces opposed to and at the opposite end of the case from the second adjustable mirror.

2. A device for manipulating testing-lenses for use in testing the eyes, consisting of a case which serves as a dark chamber, an internal division-plate which divides the case more or less into two compartments, a light-receiving aperture and an adjustable mirror in one compartment, two eyepieces and an opposed adjustable mirror at opposite ends of the other compartment, and suitable means for manipulating the lenses in the eyepieces, substantially as described.

EDMUND T. ALLEN.
EGBERT HEWITT GRIFFIN.

Witnesses:
DONALD M. CARTER,
HOMER L. KRAFT.